United States Patent [19]
Tamada et al.

[11] Patent Number: 5,748,368
[45] Date of Patent: May 5, 1998

[54] POLARIZATION OPTICAL ELEMENT

[75] Inventors: Hitoshi Tamada; Shuichi Matsumoto, both of Kanagawa; Noriaki Nishi, Chiba; Kimihiro Saito, Saitama, all of Japan

[73] Assignee: Sony Corporation, Japan

[21] Appl. No.: 576,686

[22] Filed: Dec. 21, 1995

[30] Foreign Application Priority Data

Dec. 29, 1994 [JP] Japan .................. 6-340382

[51] Int. Cl.$^6$ .................... G02B 5/30
[52] U.S. Cl. .................... 359/486; 359/485
[58] Field of Search .................... 359/485, 486

[56] References Cited

U.S. PATENT DOCUMENTS

| | | | |
|---|---|---|---|
| 2,224,214 | 12/1940 | Brown | 359/486 |
| 3,436,143 | 4/1969 | Garrett | 359/486 |
| 3,536,373 | 10/1970 | Bird et al. | 359/486 |
| 4,009,933 | 3/1977 | Firester | 359/486 |
| 4,289,381 | 9/1981 | Garvin et al. | 427/163.1 |
| 5,177,635 | 1/1993 | Keilmann | 359/352 |
| 5,225,920 | 7/1993 | Kasazumi et al. | 349/1 |

FOREIGN PATENT DOCUMENTS 0 416 157 A1  3/1991  Germany .

OTHER PUBLICATIONS

J.P. Auton, "Infrared Transmission Polarizers by Photolithography", Applied Optics, vol. 6, No. 6, Jun. 1967.

Hans Lochbihler and Ricardo A. Depine, "Characterization of Highly Conducting Wire Gratings Using an Electromagnetic Theory of Diffraction", Optics Communications, vol. 100, 231–239, 1 Jul. 1993.

Hans Lochbihler and Peter Predehl, "Characterization of X-Ray Transmission Gratings", Applied Optics, vol. 31, No. 7, 1 Mar. 1992.

*Primary Examiner*—Paul M. Dzierzynski
*Assistant Examiner*—Darren E. Schuberg
*Attorney, Agent, or Firm*—Ronald P. Kananen

[57]  ABSTRACT

A polarization optical element causes minimum loss and provides light in the visible and near-infrared regions with practically satisfactory polarization contrast even when the grid period is comparatively long. Metal grids 1 are formed on a substrate 2 with a refractive index $n_1$ to satisfy conditions $0.2 < h/d < 0.9$, $0.5 < b/d < 0.9$, and $70° < s < 110°$, where "h" is the thickness of a cross section of the grids; "b" is the width of the cross section, measured along a line passing 0.5 h away from, and in parallel with, the base of the cross section; "d" is the grid period; and "s" is the angle between the base and a leg of the cross section.

13 Claims, 7 Drawing Sheets

POLARIZATION OPTICAL ELEMENT

BACKGROUND OF THE INVENTION

1. Field of the Invention

This invention relates to a polarization optical element. More particularly, it is related to a polarizer and a polarization beam splitter which use wire grids.

2. Description of the Related Art

For conventional wire grid polarizers, it has been believed that the grid period "d" must be ⅕ or less the wavelength of the light striking the polarizer (Reference 1: J. P. Auton, "Infrared Transmission Polarizer by Photolithography", Applied Optics, Vol. 6, 1023, 1967). Thus, wire grid polarizers receiving light in the visible and the near-infrared region require so short a grid period "d" (160 nm or less) when the light wavelength is 800 nm that they have been difficult to fabricate.

In metal grids with a grid period "d" less than the wavelength of light to be used, a report has been made on a theoretical analysis which has taken into account the thickness of the metal "h", the width "b", and the cross-sectional shape characteristics, i.e., the angle "s" between their base and leg, of the grid wires. (Reference 2: Hans Lochbihler and Peter Predehl, "Characterization of X-Ray Transmission Gratings", Applied Optics, Vol. 31, 964, 1992). The report describes that the S polarization transmittance (Ts) exhibits a high peak at a grid period "d" satisfying a condition where wavelength/2<d<wavelength if proper values are selected for the thickness "h", the width "b", and the angle "s". This phenomenon is referred to as resonance.

A report has also been made on variations in the P polarization transmittance (Tp) with the thickness "h", width "b", angle "s", and wavelength, which transmittance is related to such polarization that the direction of electric field vibration is at right angles to that of the wave vector of a grid (Hans Lochbihler and Ricardo A. Depine, "Characterization of Highly Conducting Wire Gratings Using an Electromagnetic Theory of Diffraction", Optics Communications 100, 231, 1993). From these reports, if the cross-sectional parameters of a metal grid are optimized, a wire grid polarizer, which causes minimum loss (the S polarization transmittance Ts is large) and has a satisfactory extinction ratio (Ts/Tp) of 30 or more, for example, can be fabricated even at a comparatively large grid period "d" meeting the condition wavelength/2<d<wavelength. For instance, it is presumed that independent type Au grids in air described in the above reference can be used for light of wavelength >1000 nm.

However, the reports, describing the theoretical analysis as an effective means for using metal grids for X-ray spectroscopy, do not mention the technical feasibility of a polarizer or a polarization beam splitter at all. The theoretical analysis and experiments reported were performed only at light wavelengths of 1000 nm or more with independent type Au grids in air (refractive index n=1), and the reports show no effective means for causing S polarization resonance using grids formed on a substrate with a refractive index $n_1$ (>1).

The reports do not indicate the effectiveness of resonance at light wavelengths less than 1000 nm, nor do they study in terms of calculation or experiments the behavior of reflected light as exhibited when resonance occurs, and thus the feasibility of a polarization beam splitter cannot be known from the reports. The reports do not describe the effect of the angle of incidence on metal grids, either.

SUMMARY OF THE INVENTION

In view of the foregoing, an object of this invention is to provide a polarization optical element which causes minimum loss and provides light in the visible and near-infrared regions with practically satisfactory polarization contrast at a long grid period compared to wavelength.

The foregoing object and other objects of the invention have been achieved by the provision of a polarization optical element which polarizes light in the visible and near-infrared regions, ranging in wavelength from 400 to 2000 nm, in which metal grids formed on a substrate with a refractive index $n_1$ satisfies conditions 0.2<h/d<0.9, 0.5<b/d<0.9, and 70°<s<110°, where "h" is the thickness of a cross section of grids; "b" is the width of the cross section, measured along a line passing 0.5 h away from, and in parallel with, the base of the cross section; "d" is the grid period; and "s" is the angle between the base and a leg of the cross section.

Further, a polarization optical element of the present invention is also adapted so that the grid period "d" satisfies a condition where wavelength/$(2n_1)$<d<wavelength/$(1.1n_1)$. Moreover, according to this invention, the refractive index $n_2$ of a substance between the metal grids and the refractive index $n_3$ of a substance over the metal grids satisfy the conditions $|n_2-n_1|<0.2$ and $|n_3-n_1|<0.2$, such that polarized light in the direction of in electric field vibration is parallel with the wave vector of the metal grids and effectively resonated, and the refractive index for the polarized light is reduced to about 1%. A polarization optical element of the present invention is still further adapted to adjust the resonance wavelength by adaptively selecting the angle of incidence.

According to the present invention, a grid satisfying the conditions 0.2<h/d<0.9, 0.5<b/d<0.9, and 70°<s<110°, where "h" is the thickness of a cross section of metal grids formed on a substrate with a refractive index $n_1$; "b" is the width of the cross section, measured along a line passing 0.5 h away from, and in parallel with, the base of the cross section; "d" is the grid period; and "s" is the angle between the base and a leg of the cross section, enables light in the visible and near-infrared regions, ranging in wavelength from 400 to 2000 nm, to be polarized.

The nature, principle and utility of the invention will become apparent from the following detailed description when read in conjunction with the accompanying drawings in which like parts are designated by like reference numerals or characters.

DETAILED DESCRIPTION OF THE EMBODIMENTS

Preferred embodiments of this invention will be described with reference to the accompanying drawings:

(1) Wire grid polarizer of the present invention

This invention effectively utilizes S polarization resonance to create a polarizer by use of metal grids formed on a substrate with a refractive index $n_1$. The polarizer may be, for example, a reflection type wire grid polarizer with a large Rp (P polarization reflectance) and a high ratio of Rp to Rs (S polarization reflectance), a transmittance type wire grid polarizer with a large Ts (S polarization transmittance) and a high ratio of Ts to Tp (P polarization transmittance), or a polarization beam splitter with a large Ts and a large Rp and high ratios of Ts to Tp and Rp to Rs, any of which optical elements cause minimum loss and have a satisfactory extinction ratio of 30 or more, for example, light in the visible and near-infrared regions, ranging in wavelength from 400 to 2000 nm.

Figure 1:
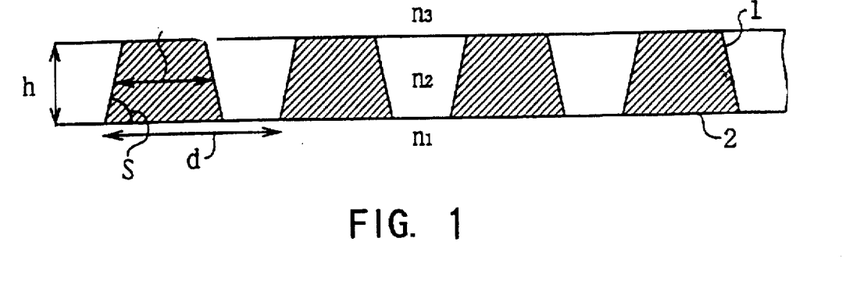
FIG. 1 is a schematic cross-sectional view showing a wire grid polarizer of the present invention.

FIG. 1 shows a resonance type wire grid polarizer, which can be used as a polarization beam splitter, according to this invention. Numeral 1 designates a metal grid, formed from a metal with a high reflectance, such as Au or Al, or a combination of these. The grids are designed to satisfy the following equations:

$$0.2 < h/d < 0.9 \quad (1)$$

$$0.5 < b/d < 0.9 \quad (2)$$

$$70° < s/d < 110° \quad (3)$$

$$|n_2 - n_1|, |n_3 - n_1| < 0.2 \quad (4)$$

where "h" is the thickness of the grid; "b" is the width of the cross section, measured along a line passing 0.5 h away from, and in parallel with, the base of the cross section; "s" is the angle which is made by the base and a leg of the grid when a trapezoid is used to approximate the cross section of the grid; "d" is the grid period, "$n_1$" is the refractive index of a substrate 2; "$n_2$" is the refractive index of a substance between grids; and "$n_3$" is the refractive index of a substance over the grids.

Figure 2A:
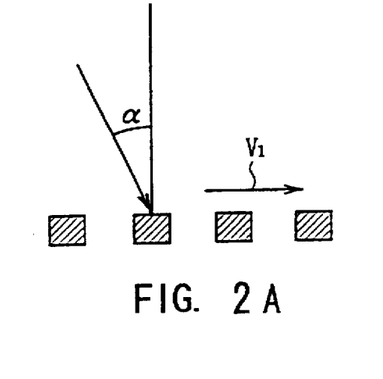
FIGS. 2A and 2B are schematic diagram explaining the angle of incidence on the wire grid polarizer of FIG. 1.
Figure 2B:
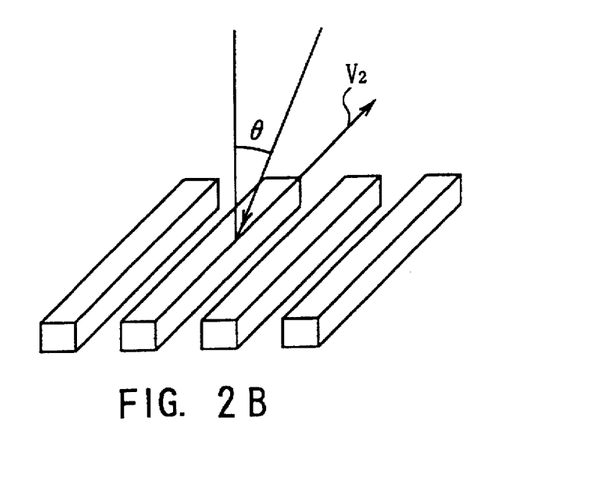

Referring to the results of experiments with embodiments, they are described below. As shown in FIGS. 2A and 2B, the angle of incidence on a wire grid polarizer is α when measured from the normal for the incidence surface of wire grid polarizer toward the direction $V_1$ of the wave vector of a grid and is θ when measured from the normal toward the vertical direction $V_2$ to the wave vector of the grid.

(2) First embodiment

In a first embodiment of this invention, a laser direct lithography system is used to form a resist pattern of a 550-nm grid period "d" on a glass substrate with a refractive index $n_1$ of 1.50. Following this, Al is first deposited on the substrate to a thickness of about 2 nm, and then Au is deposited to a thickness of about 136 nm using an electron beam depositor to form grids composed of an Al layer (2 nm thick) and an Au layer (136 nm thick) by the lift-off method (the grids are hereinafter called Au grids). The cross section of a grid, when observed under a scanning electron microscope, is found to be of a trapezoidal shape approximating to a rectangle wherein s=80°, b/d=0.6, and h/d=0.25.

Figure 3:
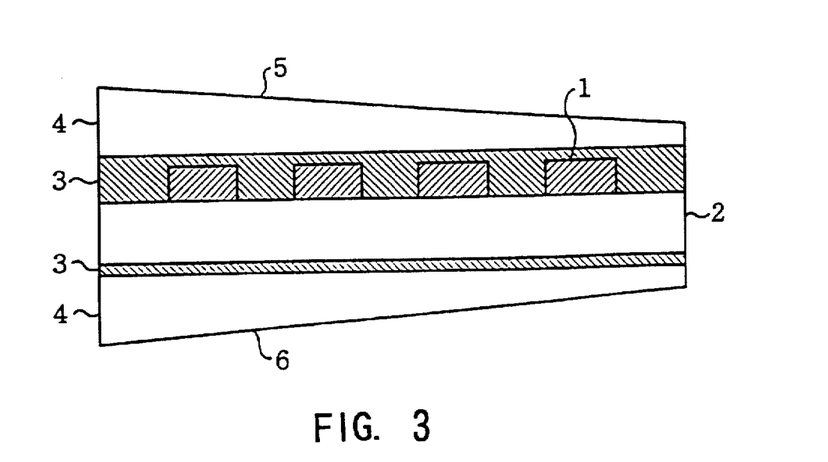
FIG. 3 is a schematic cross-sectional view showing a sample of wire grid polarizer according to an embodiment.

As shown in FIG. 3, the substrate, to both sides of which a matching oil 3 is applied, is sandwiched between wedge glass plates 4 (wedge angle: 1°) with a refractive index "n" of 1.50 to obtain a sample. Thus the wire grid polarizer of FIG. 3 is equivalent to that of FIG. 1 where $n_2=n_3=n_1=1.50$. The wedge glass plates 4 are used to accurately measure light reflected from a grid and transmitted light. Surfaces 5 and 6 may be covered with coating which reflects no light.

Figure 4:
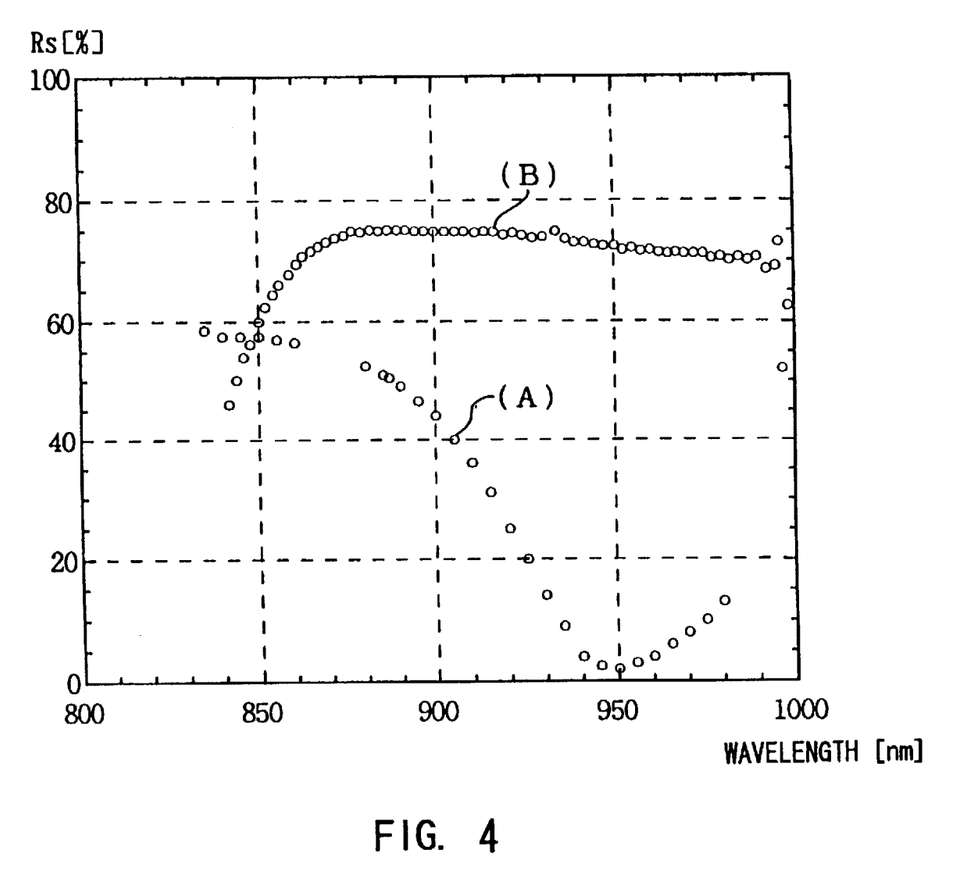
FIG. 4 is a characteristic distribution curve showing the relationship between wavelength and the S polarization reflectance.

FIG. 4 shows a curve (A) obtained by plotting S polarization reflectance Rs data measured in a wavelength range from 840 to 980 nm. The angle of incidence on the sample is θ=3°. In this case, the S polarization reflectance Rs has a minimum value of 1% or less at a wavelength of 950 nm. This S polarization resonance is expected to be the first to be observed for reflected light from an Au grid in a medium with a refractive index of 1.50.

The P polarization reflectance is Rp=60%, indicating that a resonance type wire grid polarizer is embodied for reflected light 950 nm in wavelength when the P polarization reflectance Rp=60%, and Rp/Rs>60. The polarizer obtained shows good characteristics when the grid period "d" is large, at 550 nm [=950 nm/(1.50×1.15)], that is, d=wavelength/(1.15$n_1$).

Referring now to an example for comparison, the importance of the selection of $n_2$ and $n_3$ values and "s" value control for the first embodiment is described below. The curve (B) of FIG. 4 shows the results of measurements which are made in the same way as in the case of the curve (A) when a substrate is covered with the matching oil 3 having a refractive index "n" of 1.50 and the wedge glass plate 4, with Au grids of the same shape as in the first embodiment formed only on the back of a substrate (side on which grids are not formed in the first embodiment), and air on the face (side on which grids are formed in the first embodiment). This arrangement is equivalent to the case where $n_2=n_3=1.0$ in FIG. 1. Unlike the curve (A) obtained from the first embodiment, the curve (B) shows that the S polarization reflectance Rs is almost constant, at about 70% and that resonance does not occur.

The results show that, without nearly equalizing the refractive indexes $n_1$, $n_2$, and $n_3$ with each other ($n_2=n_3=n_1$), grids formed on the substrate 2 with a refractive index $n_1$ cannot be prompted to markedly resonate so that the S polarization reflectance has a minimum value of 2% or less, for example. Specifically, the refractive indexes must satisfy the conditions $|n_2-n_1|<0.2$ and $|n_3-n_1|<0.2$, and they are preferably equal to each other as in the first embodiment.

When refractive index $n_2=n_3=n_1$ (=1.50=n), metal grids 1 with a triangular cross section and an "s" value of approximately 45°, made of Au, were not found to resonate as shown by the curve (A) in FIG. 4. Experiments with the metal grids 1 made of Au show that, in activating resonance, it is essential for the cross section of the grids to be of a rectangular shape or a trapezoidal shape approximating the rectangular shape. It is desired that the value of "s" be more than 70° and less that 110°.

(3) Second embodiment

Figure 5:
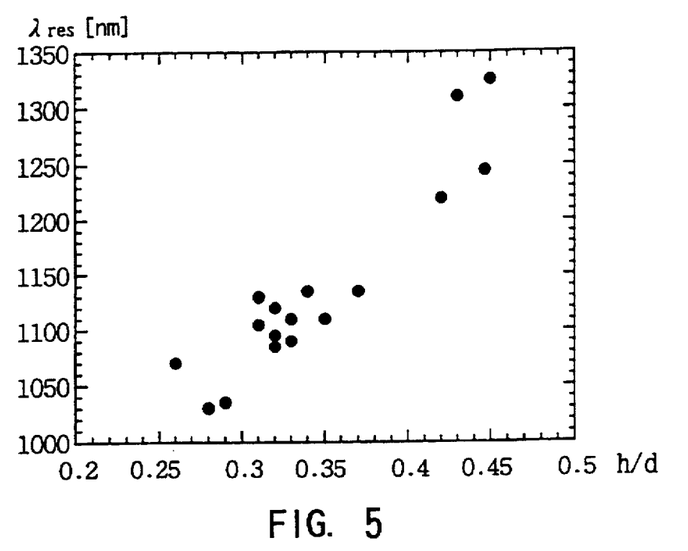
FIG. 5 is a characteristic distribution curve showing the relationship between the resonance wavelength $\lambda_{res}$ and the ratio h/d.

In a second embodiment, the resonance wavelength $\lambda_{res}$, at which Rs has a minimum value, is shown to vary with the thickness "h" and the width "b" of the grid 1 when $n_2=n_3=n_1=(=1.50=n)$ and the cross section of the grid 1 is substantially rectangular (70°<s<90°). FIG. 5 shows the relationship between the resonance wavelength $\lambda_{res}$ and ratio h/d, which relationship was obtained when the grid period d=550 nm and b/d=0.6. The angle of incidence α on a sample was about 10°. The relationship between the resonance wavelength $\lambda_{res}$ and the ratio h/d or that between $\lambda_{res}$ and b/d can be obtained by applying the theoretical analysis techniques described in Reference 2 mentioned above to the case where n=1.50. The results of experiments, shown in FIG. 5, generally agree with those of the theoretical analysis.

FIG. 5 shows that the ratio h/d must be adjusted to fabricate a resonance type wire grid polarizer which can be used for light with a specific wavelength. As the ratio b/d increases, the resonance wavelength $\lambda_{res}$ shifts to longer wavelengths, and thus the ratio b/d needs to be adjusted. The grid period "d" is selected so that $\lambda/2(n_1)<d<\lambda/n_1$. This is because the grid period "d" is increased to facilitate grid fabrication. It is concluded by theoretical analysis that h/d<0.9 in this case.

Since resonance becomes inactive in experiments with the second embodiment when h/d<0.2, the value of h/d is limited to the range from 0.2 to 0.9 exclusive (0.2<h/d<0.9). The minimum value of Rs was 2% or less for all data in FIG. 5, causing marked resonance to occur. On the other hand, the value of Rp was increased with increasing value of b/d. To satisfy a condition Rp>60%, the value of b/d had to be larger than 0.5. Because of difficulty in grid fabrication, the value of b/d is less than 0.9, and thus the ratio b/d is limited so that it ranges from 0.5 to 0.9 exclusive (0.5<b/d<0.9).

(4) Third embodiment

In a third embodiment, the S polarization reflectance Rs had a minimum value less than 2% at a resonance wavelength $\lambda_{res}$ of about 1000 to 1100 nm, that is, marked resonance was exhibited when refractive index $n_2=n_3=n_1$ (=1.50=n), the cross section of the metal grid 1 was almost rectangular (s=80°), the grid period "d" had a constant value of 550 nm, h/d=0.28 to 0.35, and b/d=0.6. The S polarization transmittance Ts reached a peak at a wavelength a little longer than the resonance wavelength $\lambda_{res}$. That wavelength is represented by the symbol $T_{s,res}$. The relationships between $T_{s,res}$ and metal materials for grids are shown in FIG. 6.

Figure 6:
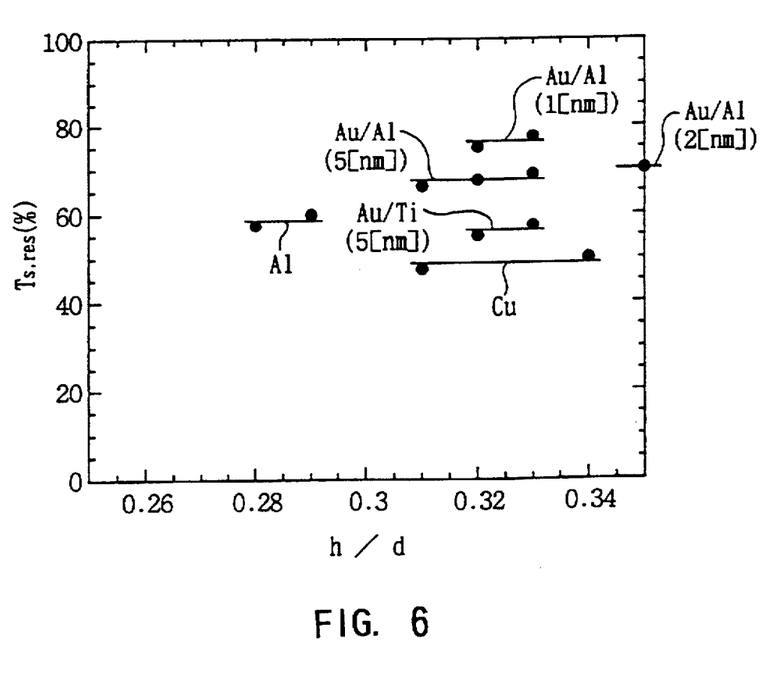
FIG. 6 is a characteristic distribution curve showing the relationships between $T_{s,res}$ and grid metal materials.

As shown in FIG. 6, the value of $T_{s,res}$ is low, at 50% for copper. It is also about 59% for an aluminum layer and about 57% for an Au layer underlaid with a titanium layer 5 nm thick. For the Au layer underlaid with the aluminum layer, the value of $T_{s,res}$ was increased from 67% to 71% to 77% as the thickness of the aluminum layer is reduced from 5 nm to 2 nm to 1 nm.

Figure 7:
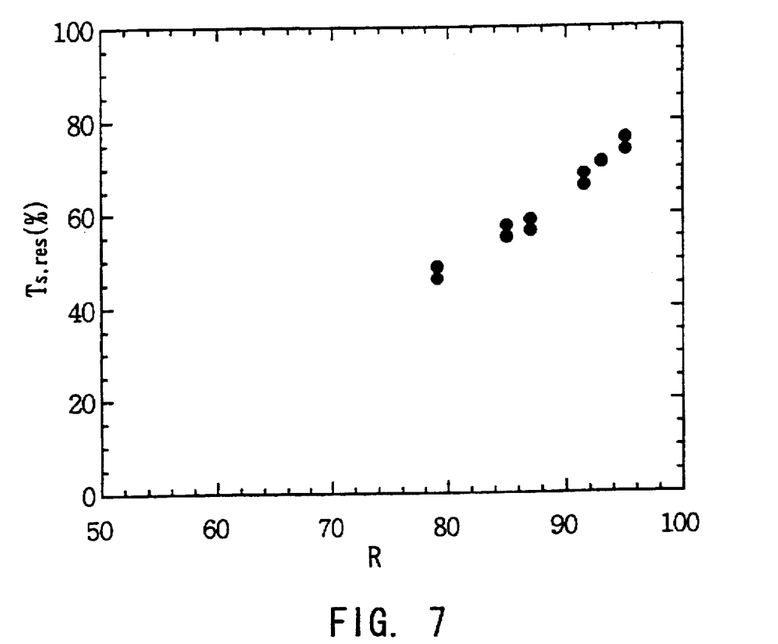
FIG. 7 is a characteristic distribution curve showing the relationship between the surface layer/underlayer average reflectance and $T_{s,res}$.

As shown in FIG. 7, these results can be plotted against surface layer/underlayer average reflectance R (average of the reflectance of a surface layer and that of an underlayer). FIG. 7 shows that the reflectance of both the surface layer and the underlayer must be high to increase the value of $T_{s,res}$. An Au layer is underlaid with an underlayer because deposited Au coating itself is, in general, weak in adhesion and thus tends to peel.

(5) Fourth embodiment

Figure 8:
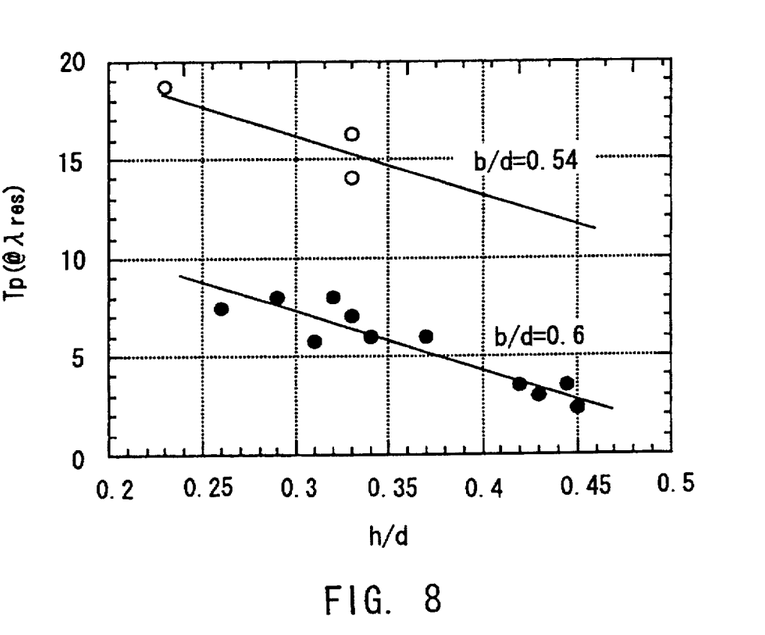
FIG. 8 is a characteristic distribution curve showing the relationship between the ratio h/d and Tp(@$\lambda_{res}$)

In a fourth embodiment, the relationship between the P polarization transmittance [Tp(@$\lambda_{res}$)] at a resonance wavelength $\lambda_{res}$ and the ratios h/d and b/d was examined where $n_2=n_3=n_1$ (=1.50=n), the cross section of the metal grid 1 was almost rectangular (s=80°), an Au layer underlaid with an aluminum layer 2 nm thick was used as grid material, and the grid period "d" had a constant value of 550 nm. The results in FIG. 8 show that both ratios h/d and b/d must be increased to reduce the value of Tp(@$\lambda_{res}$). A TP(@$\lambda_{res}$) value of 5% or less assumes b/d>0.6 and h/d>0.38.

(6) Fifth embodiment

Figure 9A:
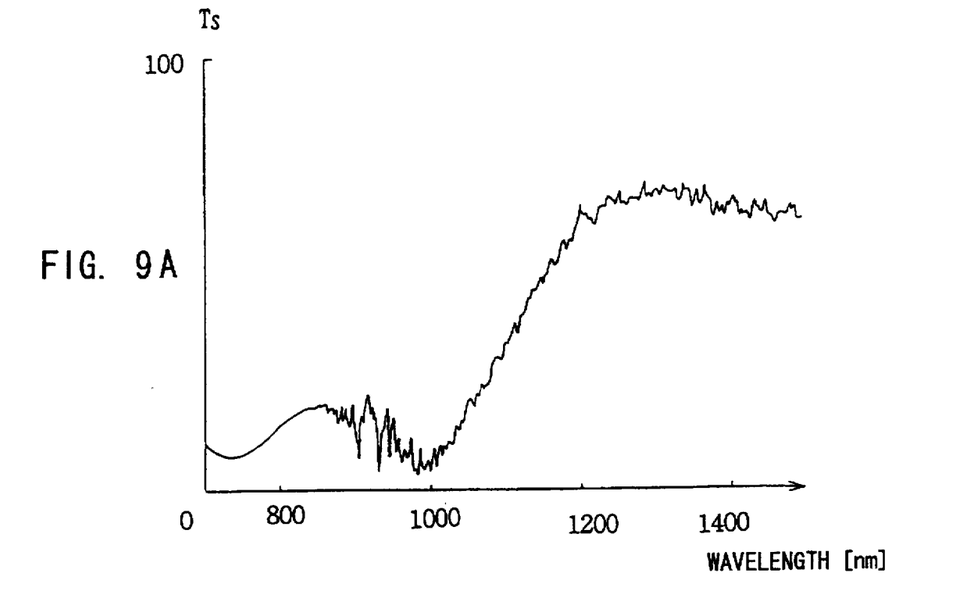
FIGS. 9A and 9B are characteristic distribution curves showing the dependence on wavelength of Ts and Tp.
Figure 9B:
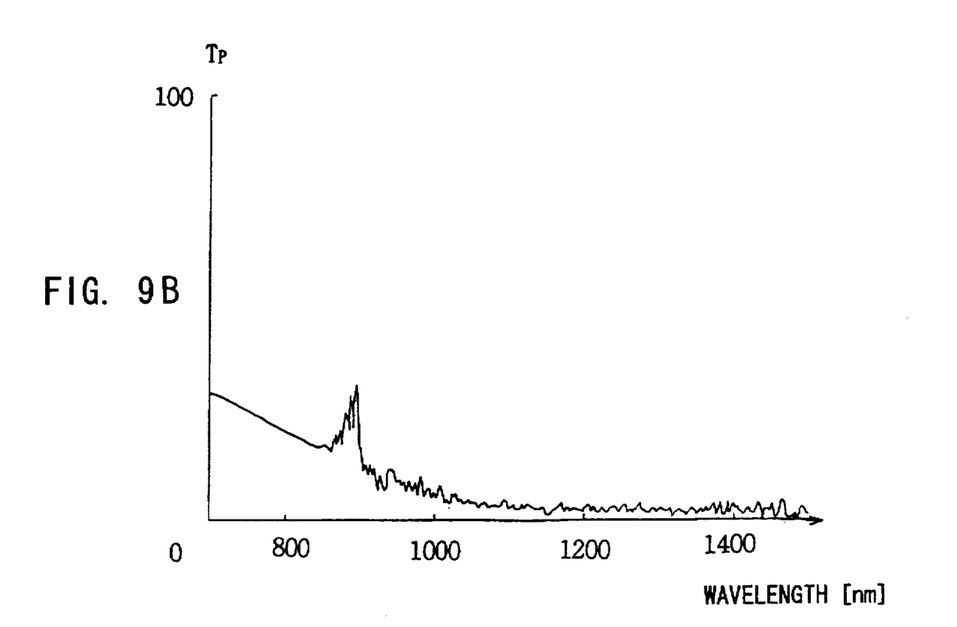

In a fifth embodiment, Au grids whose values of b/d and h/d are 0.65 and 0.45, respectively, are fabricated based on the results of experiments with the fourth embodiment. The results of the determination of the dependence on wavelength of the S polarization transmittance Ts and the P polarization transmittance Tp are shown as curves (A) and (B) in FIGS. 9A and 9B. At a wavelength of 1300 nm, a Ts value of approximately 70% and a Tp value of approximately 2% are obtained, resulting in a wire grid polarizer for transmitted light for which the value of Ts/Tp is approximately 35. The wire grid polarizer exhibited satisfactory characteristics at a grid period "d" of 550 nm [=1300 nm/(1.5×1.58)] longer than a grid period "d" of nearly 260 nm (d<260 nm) required by conventional wire grid polarizers.

When the dependence on wavelength of the S polarization reflectance Rs and the P polarization reflectance Rp was investigated, the S polarization reflectance Rs was found to have a minimum value less than 2% at a wavelength of approximately 1300 nm, thus leading to marked resonance. The P polarization reflectance was about 70%. Thus, the fifth embodiment was found to offer polarization performance for reflected light for which Rp/Rs>35, and a resonance type polarization beam splitter is ascertained to operate satisfactorily.

(7) Sixth embodiment

Figure 10:
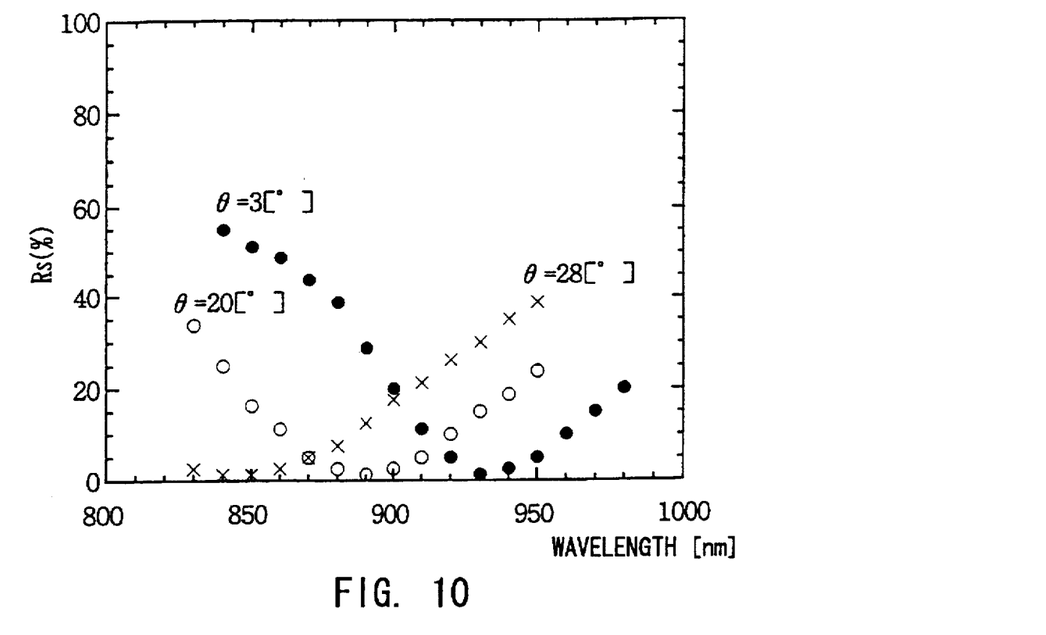
FIG. 10 is a characteristic distribution curve explaining the changes in Rs with wavelength.

In a sixth embodiment, changes in the S polarization reflectance Rs with wavelength were measured for different angles of incidence θ, using Al grids wherein $n_2=n_3=n_1$ (=1.50=n), s=80°, the grid period "d" is 550 nm, h/d=0.29, and b/d=0.6. The results are shown in FIG. 10. As the angle of incidence θ is increased from 3° to 20° to 28°, the wavelength $\lambda_{res}$ at which Rs has a minimum value changed from 930 nm to 890 nm to 840 nm, respectively.

Figure 11:
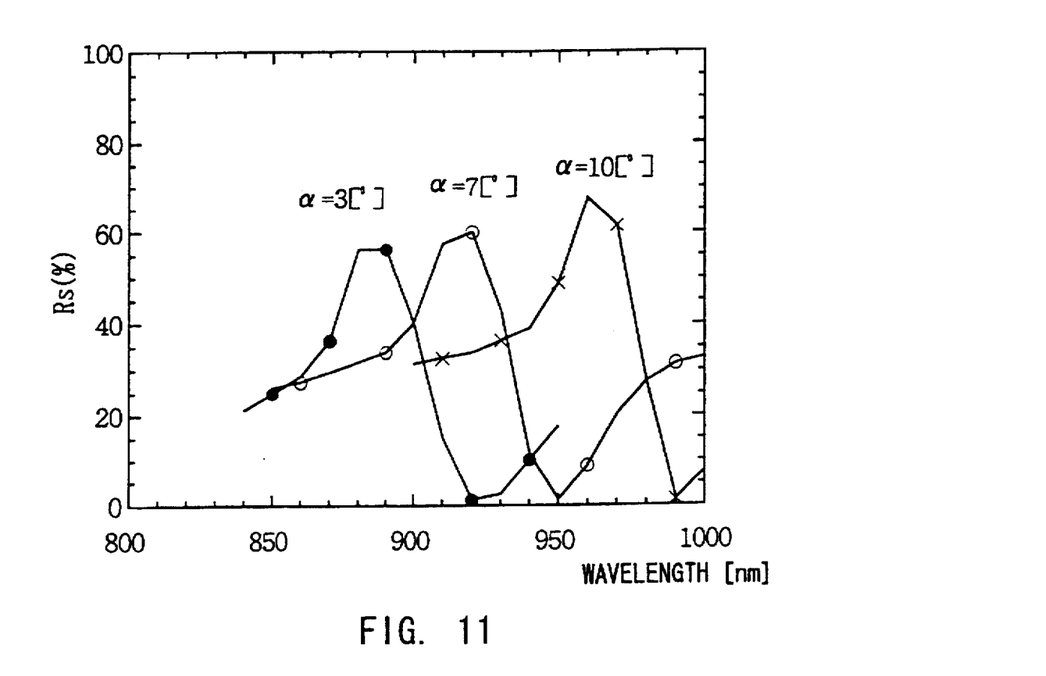
FIG. 11 is a characteristic distribution curve explaining the dependence on the angle of incidence α.

Using Al grids wherein h/d=0.26 and b/d=0.5, the dependence on α of the S polarization reflectance was measured. The results are shown in FIG. 11. As the angle of incidence α is increased from 3° to 7° to 10°, the wavelength $\lambda_{res}$ at which Rs has a minimum value changed from 920 nm to 950 nm to 990 nm, respectively.

The above-described results show that the angles of incidence θ and α can properly be selected to adjust the resonance wavelength $\lambda_{res}$ of a sample over a considerably wide range. In particular, increasing the angle of incidence θ allows the resonance wavelength $\lambda_{res}$ to shift to shorter wavelengths. This in turn means that setting the angle of incidence θ larger allows a longer grid period in favor of wire grid polarizer fabrication when the wavelength of light to be used is determined.

(8) Seventh embodiment

Figure 12:
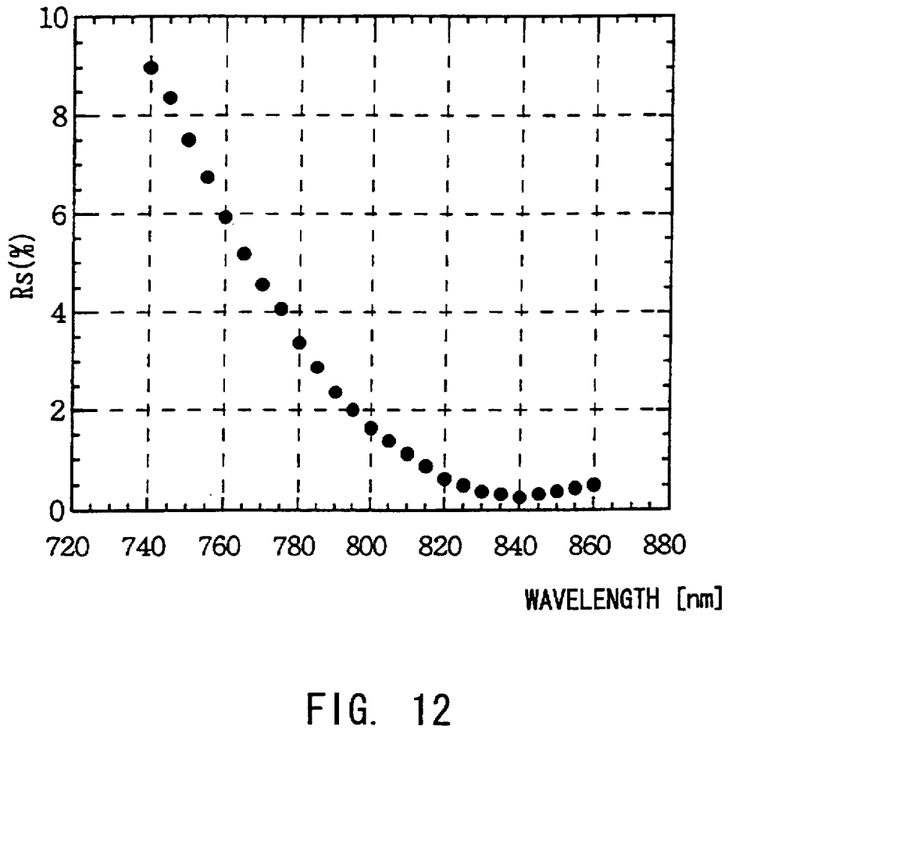
FIG. 12 is a characteristic distribution curve explaining the dependence on wavelength of Rs.

In a seventh embodiment of the present invention, a laser direct lithography system is used in the same way as in the first embodiment to form grids of a 400 nm period "d", composed of an Au layer 180 nm thick and an Al layer 20 nm thick, on a quartz substrate with a refractive index $n_1$ of 1.46, in which grids h/d=0.5, b/d=0.6, and s=80°. As in FIG. 3, a matching oil with an refractive index "n" of 1.46 is applied to the grids, and they are sandwiched between wedge quartz substrates to obtain a sample. FIG. 12 shows the results of measurements of the dependence on wavelength of the S polarization reflectance Rs by use of the sample. The angle of incidence θ was approximately 3°.

The S polarization reflectance Rs had a minimum value of 1% or less near a wavelength of 840 nm. This and the results obtained from the sixth embodiment have shown that resonance is found to occur not only at specific wavelengths more than 1000 nm but at those around 800 nm. In the seventh embodiment in which the P polarization reflectance is approximately 70%, a resonance type wire grid polarizer is embodied for satisfactory reflected light. The grid period "d" is longer, at 400 nm [=840 nm/(1.46×1.44)], that is, d=wavelength/(1.44$n_1$), compared with conventional wire grid polarizers.

(9) Eighth embodiment

In an eighth embodiment, a grating composed of Al only is fabricated, wherein the grid period d=400 nm, h/d=0.5, b/d=0.5, and s=80°. Marked resonance was again observed at a wavelength of about 800 nm. The S polarization reflectance Rs had a minimum value of 1% or less. Since aluminum has a high reflectance at short wavelengths of the order of 400 nm, setting the grid period "d" to approximately 400 nm/(1.44n₁) allows resonance to be utilized even at a wavelength of 400 nm.

(10) Other embodiments

To fabricate the above-described wire grid polarizers (polarization beam splitters) in the embodiments, a resist pattern is first formed using a laser direct lithography system or an electron beam direct lithography system, then an Au coating or an Al coating is deposited on the pattern using an electron beam depositor, and finally, the resist and metal thereon are removed by immersing the resist in resist stripper, that is, by the "lift-off method." Other methods can be used instead of the lift-off method.

Alternatively, for example, a metal coating is first deposited on the entire surface of a substrate by the evaporation method or by the sputtering method, then a resist pattern is formed on the substrate, and finally, reactive ion etching (RIE) or Ar ion trimming is done to form metal grids. Mask exposure using an ultraviolet source, such as an excimer laser, and the two-light beam interference method are effective in forming a resist pattern.

While the foregoing has described the preferred embodiments of the invention, it will be obvious to those skilled in the art that various changes and modifications may be made. The appended claims are intended to include all such changes and modifications as fall within the true spirit and scope of the invention as defined by the claims.

What is claimed is:

1. A polarization optical element for polarizing an incident light beam, comprising:
    a light source producing a light beam with a wavelength between 0.4 and 1.0 μm; and
    a grid composed of a plurality of elongated metal parts formed on a substrate on which said light beam is incident; wherein:
    said elongated metal parts each have a cross section, said cross section having a base, sides and top;
    said grid satisfies the conditions of $0.2<h/d<0.9$, $0.5<b/d<0.9$, and $70°<s<100°$, where
    "h" is the thickness of said cross section measured from said base to said top;
    "b" is the width of the cross section, measured along a line passing 0.5 h away from, and in parallel with, said base;
    "d" is the grid period; and
    "s" is the angle between said base and a side of the cross section.

2. A polarization optical element for polarizing an incident light beam, comprising a grid composed of a plurality of elongated metal parts formed on a substrate; wherein:
    said elongated metal parts each have a cross section, said cross section having a base, sides and top;
    said grid satisfies the conditions of $0.2<h/d<0.9$, $0.5<b/d<0.9$, and $70°<s<100°$, where
    "h" is the thickness of said cross section measured from said base to said top;
    "b" is the width of the cross section, measured along a line passing 0.5 h away from, and in parallel with, said base;
    "d" is the grid period; and
    "s" is the angle between said base and a side of the cross section; and
    said grid period "d" satisfies the condition of $\lambda/(2n_1)<d<\lambda/(1.1n_1)$, where $n_1$ is the refractive index of said substrate; and "λ" is the wavelength of the incident light beam.

3. The polarization optical element according to claim 2, wherein said grids are formed with Au or Al.

4. The polarization optical element according to claim 2, wherein said wire metal parts further comprise:
    a layer of Au; and
    a layer of Al.

5. A polarization optical element, comprising:
    grid parts comprising a plurality of wire metal parts;
    first and second light transmittance layers which sandwich said grid parts; and
    a light transmittance part which is loaded between said respective wire metal parts, wherein
    the conditions of $|n_4-n_2|<0.2$, $|n_3-n_2|<0.2$ are satisfied, where the refractive indices of said first and second light transmittance layers are $n_2$ and $n_3$, respectively, and a refractive index of said light transmittance part is $n_4$; and
    said metal grids satisfy the condition of $0.6<b/d<0.9$, where "b" is the width of a cross section of said wire metal parts; and "d" is the grid period.

6. The polarization optical element according to claim 5, wherein said light transmittance layers are made of glass.

7. The polarization optical element according to claim 5, wherein said grids are formed with Au or Al.

8. The polarization optical element according to claim 5, wherein said wire metal parts further comprise:
    a layer of Au; and
    a layer of Al.

9. A polarization optical element comprising:
    a substrate;
    a metal grid formed on said substrate;
    a layer of matching oil disposed on both sides of said substrate; and
    first and second transparent plates which sandwich said substrate and matching oil;
    wherein said first and second transparent plates each have a wedge shape wherein a first side of each of said plates makes a 1° angle with a second side opposite said first side.

10. A polarization optical element comprising:
    a substrate;
    a metal grid formed on said substrate;
    a layer of matching oil disposed on both sides of said substrate; and
    first and second transparent plates which sandwich said substrate and matching oil;
    wherein said metal grid further comprises:
    a layer of Au; and
    a layer of Al.

11. A polarization optical element as claimed in claim 10, wherein outer sides of said first and second transparent plates are coated with a non-reflective coating.

12. The polarization optical element according to claim 10, wherein said first and second transparent plates are made of glass.

13. The polarization optical element according to claim 10, wherein said substrate is made of glass.

* * * * *